US007374100B2

(12) United States Patent
Jei et al.

(10) Patent No.: US 7,374,100 B2
(45) Date of Patent: May 20, 2008

(54) MOBILE TERMINAL HAVING SMART CARD COUPLED WITH RFID TAG AND METHOD FOR PERFORMING RFID FUNCTION IN SUCH MOBILE TERMINAL

(75) Inventors: Dae-Gunn Jei, Seongnam-si (KR); Yong-Han Lee, Suwon-si (KR)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 10/970,102

(22) Filed: Oct. 21, 2004

(65) Prior Publication Data

US 2005/0116050 A1 Jun. 2, 2005

(30) Foreign Application Priority Data

Nov. 27, 2003 (KR) ...................... 10-2003-0085300

(51) Int. Cl.
*G06K 19/06* (2006.01)

(52) U.S. Cl. ...................... 235/492; 235/379; 235/375; 705/14; 705/2; 705/44; 705/21; 711/163; 702/104; 375/242

(58) Field of Classification Search ................ 235/492, 235/379, 375; 705/14, 2, 44, 21; 711/163; 702/104; 375/242
See application file for complete search history.

(56) References Cited

U.S. PATENT DOCUMENTS 4,075,632 A 2/1978 Baldwin et al.
4,360,810 A 11/1982 Landt
4,739,328 A 4/1988 Koelle et al.
4,782,345 A 11/1988 Landt
4,786,907 A 11/1988 Koelle
4,816,839 A 3/1989 Landt
4,835,377 A 5/1989 Brown
4,853,705 A 8/1989 Landt
5,394,439 A * 2/1995 Hemmati .................... 375/242
5,640,002 A * 6/1997 Ruppert et al. ........ 235/462.46

(Continued)

FOREIGN PATENT DOCUMENTS

EP 1 522 955 4/2005

(Continued)

*Primary Examiner*—Michael G. Lee
*Assistant Examiner*—Allyson N Trail
(74) *Attorney, Agent, or Firm*—The Farrell Law Firm, PC

(57) ABSTRACT

Disclosed is a mobile terminal equipped with a smart card coupled with an RFID tag and a method for performing an RFID function in the mobile terminal. The smart card includes a user information processing section for storing user information and generating a user information signal including user information, an RFID information processing section for storing RFID data and generating an RFID signal including the RFID data, and a main calculating section connected to the user information processing section in order to control a generation and a transmission of the user information signal and connected to the RFID information processing section order to command a generation and a transmission of the RFID signal. When the RFID tag detects an approach of an RFID interrogator, the RFID tag requests a CPU of the smart card to perform the RFID function. Thus, the CPU of the smart card transmits a mode transition signal to a processor of the mobile terminal in order to indicate a mode transition into an RFID mode. Then, the RFID function is carried out.

20 Claims, 6 Drawing Sheets

510
508
502
RFID MODULATION SECTION
RFID CODEC SECTION
RAM
VCC C1
C5 GND
RST C2
C6 Vpp
516
522
500
504
CLK C3
CLOCK MODULATION SECTION
518
520
CPU
ROM
RFID DATA
C7 I/O
514
512
506
RFU C4
RFU C8
COIL CONNECTING SECTION
INTERRUPT SECTION
EEPROM
RFID DATA

U.S. PATENT DOCUMENTS 5,991,749 A * 11/1999 Morrill, Jr. .................. 705/44
6,775,632 B1 * 8/2004 Pollack et al. .............. 702/104
2001/0004236 A1 * 6/2001 Letkomiller et al. ..... 340/572.1
2002/0002534 A1 * 1/2002 Davis et al. ................ 235/379
2002/0165780 A1 * 11/2002 Terranova .................... 705/21
2003/0006280 A1 1/2003 Seita et al.
2004/0016796 A1 * 1/2004 Hanna et al. ............... 235/375
2004/0059884 A1 * 3/2004 Iwasaki ...................... 711/163
2004/0121793 A1 * 6/2004 Weigele et al. ............. 455/522
2004/0203352 A1 * 10/2004 Hall et al. ................. 455/41.1

FOREIGN PATENT DOCUMENTS

JP 10-098542 4/1998
JP 2002/247157 8/2002
KR 10-2002-0040455 7/2002

* cited by examiner

| Identifier :'6F4F' | Structure : Transparent | | Optional |
|---|---|---|---|
| File Size : 4 bytes | Update Activity : Low | | |
| Access Conditions :<br>READ CHV1<br>UPDATE ADM<br>INVALIDATE ADM<br>REHABILITATE CHV1 | | | |
| BYTES | DESCRIPTION | M/O | Length |
| 1 - 4 | RFID data | M | 4 bytes |

MOBILE TERMINAL HAVING SMART CARD COUPLED WITH RFID TAG AND METHOD FOR PERFORMING RFID FUNCTION IN SUCH MOBILE TERMINAL

PRIORITY

This application claims priority to an application entitled "Mobile Terminal Having Smart Card Coupled With RFID Tag and Method For Performing RFID Function in Such Mobile Terminal" filed in the Korean Industrial Property Office on Nov. 27, 2003 and assigned Serial No. 2003-85300, the contents of which are hereby incorporated by reference.

BACKGROUND OF THE INVENTION

1. Field of the Invention

The present invention relates to a mobile terminal having an RFID (radio frequency identification) tag, the usage and importance of which have increased, and a detachable SIM (subscriber identification module), the usage and importance of which have also increased, and more particularly to a circuit in which an RFID tag is integrally coupled with an SIM, a mobile terminal circuit having the circuit and a method for performing an RFID function in a mobile communication terminal.

2. Description of the Related Art

An RFID transponder or a tag has been developed in an agriculture department of U.S. National Laboratory to identify livestock. The tag having an electric code capable of identifying an animal is inserted into or attached to the animal. In addition, an interrogator capable of interpreting such electrical code is installed in an animal stable, thereby conveniently checking whether the animal has returned to the stable. The interrogator transmits an RF signal to the tag, and the electric code stored in the tag is returned to the interrogator through a modulator of the tag. This is called a backscatter modulation. An RFID tag has an antenna coil through which a modulation signal is transmitted to the interrogator. Such systems are described in U.S. Pat. Nos. 4,075,632 and 4,360,810, the contents of which are incorporated by reference herein.

As RFID techniques make great strides, other techniques for identifying moving objects have been applied to various fields. For example, the techniques have been utilized for vehicles, ocean conveyance containers, or railroad vehicles. Information stored in a tag of such a transportation device is used for a location tracking, a content identification, and so forth. Techniques in relation to such fields are disclosed in U.S. Pat. Nos. 4,739,328, 4,782,345, 4,786,907, 4,816,839, 4,835,377, and 4,853,705, the contents of which are incorporated by reference herein.

Recently, the RFID technique has been tested in many kinds of fields. A communication system used in such fields has come into the spotlight, owing to wide applicability. For instance, since a mobile communication system has many subscribers, in a case where the mobile communication system employing new techniques such as RFID is industrialized, it is possible to easily make profits. Also, since a current mobile communication is stabilized in the aspect of profitability, vendors request to develop applications capable of making supplementary value.

FIG. 1 shows a structure of a passive RFID tag. A tag shown in FIG. 1 is MCRF200 available from Microchip Technology, Inc.

A modulation circuit 209 is a part for connecting antenna coils (not shown) to RFID circuit elements. As an RFID interrogator (not shown) approaches an RFID tag, according to Faraday's law, the antenna coil generates induced electromotive force through an inductive coupling between the RFID interrogator and the RFID tag. Voltage intensity of the antenna coil varies depending on a modulated signal outputted from the modulation circuit 209.

A rectifying section 202 rectifies AC voltage of the induced electromotive force in order to supply DC voltage to other components. A clock generating section 201 generates a system clock by extracting carrier frequency from a signal transferred from the RFID interrogator. The clock generating section 201 supplies other circuit components of the RFID tag with a baud rate, a modulation rate, and a programming rate. A row decoder 204 and a column decoder 207 extract ID data stored in a memory 206 at a clock rate and encode an extracted ID data by means of an NRZ (Non Return to Zero) Direct method, a Differential Biphase method, or a Manchester Biphase method before modulation, thereby generating a serial data stream.

A modulation control section 203 modulates the serial data stream transferred from the decoders 204 and 207 by using a predetermined method, such as an FSK (Frequency Sift keying) method or a PSK (Phase Shift Keying) and the like, and transfers the serial data stream to the modulation circuit 209. A counter 205 counts clocks outputted from the clock generating section 201, so as to provide the clocks to the row decoder 204 and the column decoder 207.

In a case in which a mobile communication system employs an RFID technique, it is expected to provide various supplementary services suitable for cellular systems. In this case, it is absolutely necessary that current RFID equipment are properly combined with current cellular systems. It has already mentioned that an RFID tag (e.g., a card-type RFID tag) is combined with an existing mobile terminal. An example of the RFID tag is disclosed in Korean Patent laid-open publication No. 2002-0090929 entitled "mobile communication terminal apparatus".

However, since a generally-used RFID tag is only provided for an existing mobile terminal circuit without modifying it or performing an adaptation process, the problem occurs that such an RFID tag is not adaptable for the miniaturization and portability of the existing mobile terminal which are essential features of a mobile terminal.

Meanwhile, a mobile telephone having a GSM (Global System for Mobile telecommunication) mode generally uses a SIM card for identifying subscribers. The SIM card has a small-sized card shape and is used while being set in a slot provided on a rear side of a body of a GSM mode mobile telephone.

FIG. 2 shows a structure of a conventional SIM card for a mobile terminal.

A SIM card used for mobile communication systems, such as GSM systems, is defined in GSM 11.11 Standard, GSM 11.12 Standard, and ISO/IEC 7816. In these standard documents, physical characteristics and electrical signals and transmission protocols of the SIM card and a logical model for the SIM card are explained. The SIM card has 8 external pins. Contact pins C1, C2, C3, C5, and C6 refer to voltage Vcc, a reset RST, a clock CLK, a ground GND, and program voltage Vpp, respectively. A contact pin C7 is an external pin for data input/output I/O and is connected to an antenna for identifying radio frequency. Also, contact pins C4 and C8 RFUs are reserved.

The SIM card internally has a Read Only Memory (ROM) 304 including an operation system operating the SIM card, a Central Processing Unit (CPU) 300 controlling an SIM card operation, a Random Access Memory (RAM) 302 which is a data processing block, and an Electrically Erasable Programmable Read Only Memory (EEPROM) 306 storing identity information of the SIM card.

The SIM card is a kind of a smart card. If an RFID tag having functions of the smart card is separately provided for a mobile communication terminal capable of detaching the SIM card, wasteful factors occur. If the SIM card and the RFID tag are separately provided for the mobile communication, it is difficult to manage the RFID tag for service vendors, who provide various services using the SIM card and pursue added value creation through the various services. Accordingly, it is impossible for the service vendors to acquire the expected advantages resulting from employing the RFID tag, which are namely an increase of profit by means of an RFID service, an increase of the number of subscribers, and an expansion of a service range.

There exists a method in which the SIM card provides additional functions besides a primary function for authenticating mobile terminal users. For instance, a SIM/WIM card which achieves a WIM (Wireless Application Protocol Identify Module) function for providing application services is formulated as WAP Provisioning Smart Card WAP-186-PROVSC-20010710-a Version by the WAP forum. Toolkit applications providing additional services by dynamically using the SIM card are defined in the GSM 11.14 Standard.

The above-mentioned forum or standards only defines file structures and protocols for providing application services, and do not define hardware or software protocols accompanied with combination or connection between the RFID tag and the SIM card. Also, the above-mentioned forum or standards do not solve all existing problems.

SUMMARY OF THE INVENTION

Accordingly, the present invention has been made to solve the above-mentioned problems occurring in the prior art, and an object of the present invention is to provide a smart card coupled with an RFID tag.

Another object of the present invention is to provide a mobile terminal capable of mounting a smart card coupled with an RFID tag thereon and a method for performing an identification function in a mobile terminal.

In order to accomplish the above objects, according to a first aspect of the present invention, there is provided a smart card comprising: a user information processing section for storing user information and generating a user information signal including user information; an RFID information processing section for storing RFID data and generating an RFID signal including the RFID data; and a main calculating section connected to the user information processing section, in order to control generation and transmission of the user information signal, and connected to the RFID information processing section in order to command generation and transmission of the RFID signal.

In order to accomplish the above objects, according to a second aspect of the present invention, there is provided a mobile terminal comprising: a smart card installed in the mobile terminal for storing user information, the smart card including an RFID tag; and a processor in communication with the smart card so as to grant or reject an RFID function of the smart card.

In order to accomplish the above objects, according to a third aspect of the present invention, there is provided a method for performing an RFID function in a mobile terminal equipped with a smart card having an RFID tag, the method comprising: detecting an approach of an RFID interrogator by using the RFID tag; requesting a CPU of the smart card to perform the RFID function by utilizing the RFID tag detecting the approach of the RFID interrogator; transmitting a mode transition signal to a processor of the mobile terminal by using the CPU of the smart card to indicate a mode transition into an RFID mode; and performing the RFID function by using the smart card after transmitting the mode transition signal.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENTS

Figure 1:
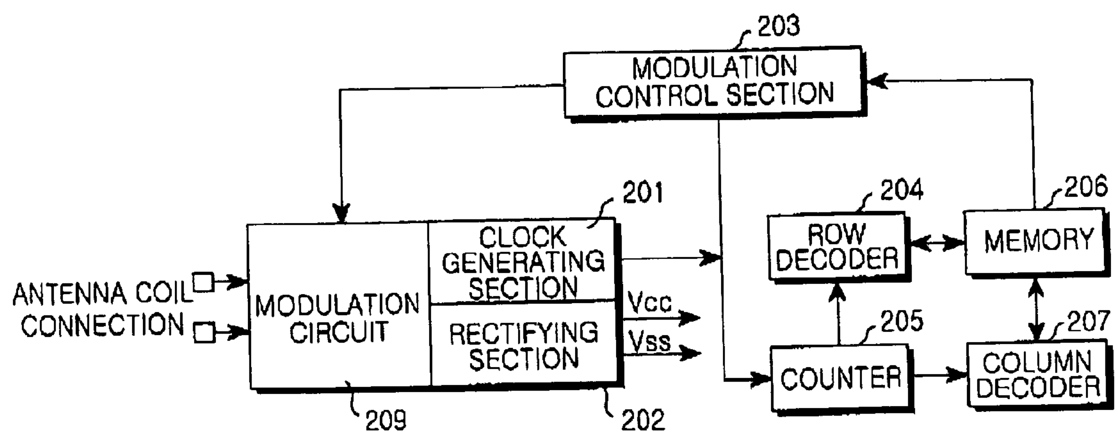
FIG. 1 is a block diagram of a conventional radio frequency identification (RFID) tag.
Figure 2:
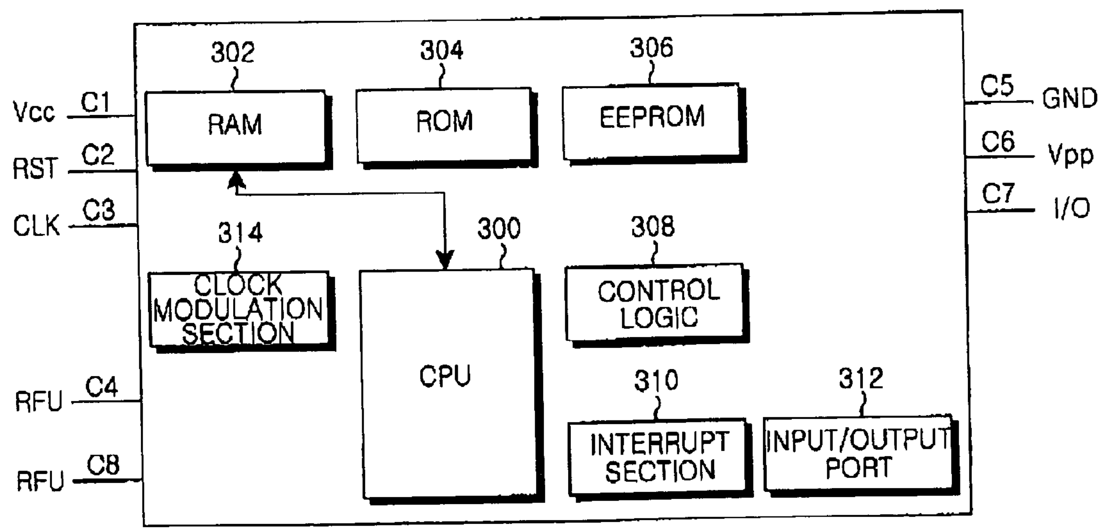
FIG. 2 is a block diagram of a conventional SIM card.

Hereinafter, preferred embodiments of the present invention will be described with reference to the accompanying drawings. Although certain functions, such as elements of a specific circuit, are specifically defined in the following description of the present invention, it will be obvious to those skilled in the art that such definitions of functions are merely to improve understanding of the present invention and that the present invention can be carried out without such specific elements. Also, in the following description of the present invention, the same reference numerals are used to designate the same or similar components and a detailed description of known functions and configurations incorporated herein are omitted to avoid making the subject matter of the present invention unclear.

A SIM card coupled with an RFID tag is an improvement of a conventional SIM card in view of hardware configuration, logical structure, and operational procedure.

1) Hardware Configuration

Figure 3:
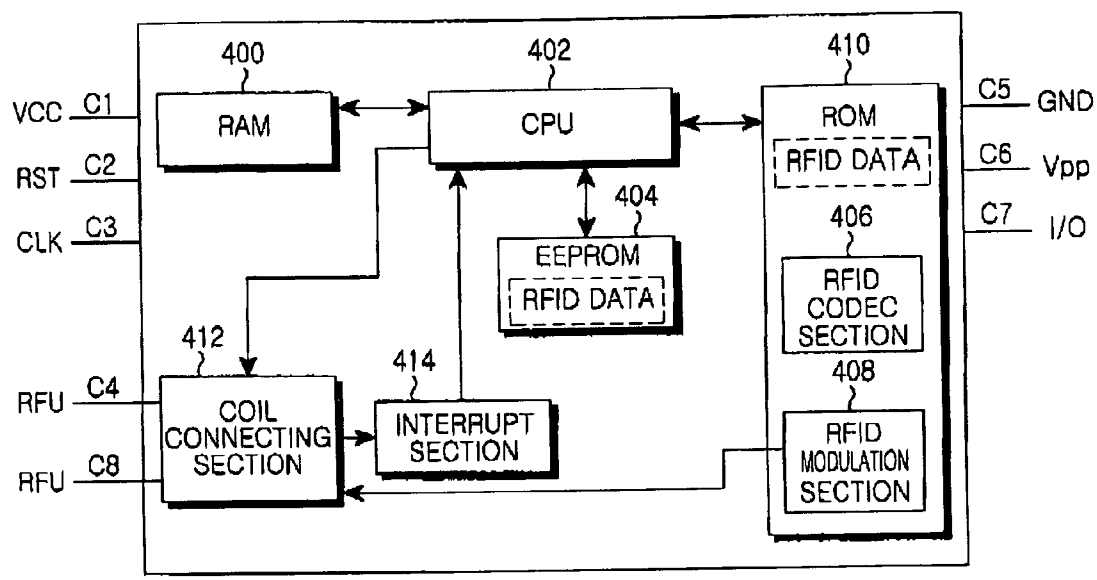
FIG. 3 is a block diagram of an SIM card coupled with an RFID tag according to a first embodiment of the present invention.
Figure 4:
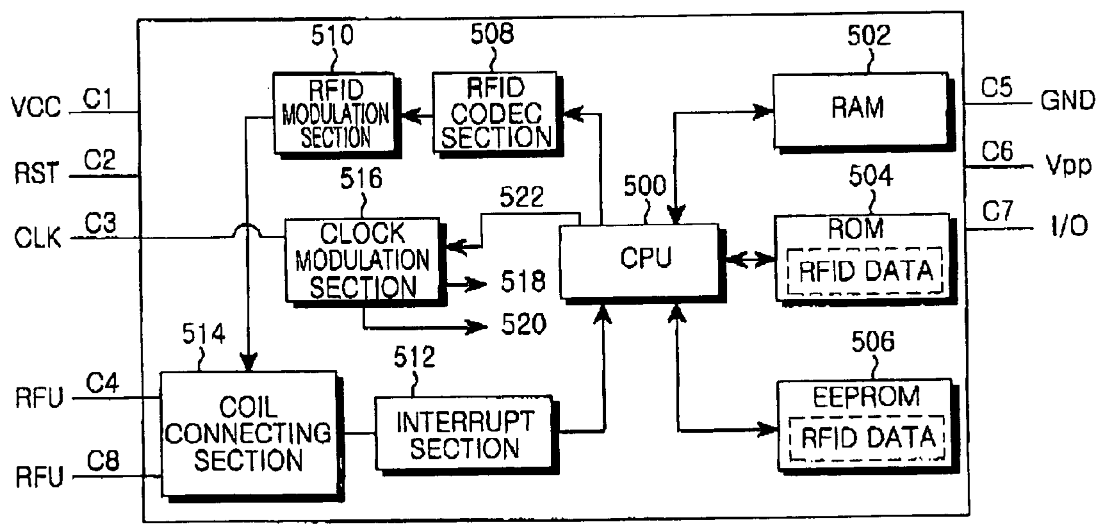
FIG. 4 is a block diagram of an SIM card coupled with an RFID tag according to a second embodiment of the present invention.

FIGS. 3 and 4 are block diagrams of a SIM card coupled with an RFID tag according to exemplary embodiments of the present invention.

FIG. 3 is a view showing the structure of the SIM card coupled with the RFID tag according to a first embodiment of the present invention. In FIG. 3, several already-known components of the SIM card are not illustrated. In addition, RFID data shown as a dotted-block in FIG. 3 represent that an RFID memory section can be provided in an EEPROM 404 or in an ROM 410.

In a conventional RFID tag, ID (identification) data are generally stored in an EEPROM. However, the SIM card also includes the EEPROM. Thus, a margin space of the EEPROM can be utilized as a storage space of RFID data. That is, the EEPROM 404 stores RFID data as well as intrinsic data of the SIM card.

An RFID CODEC section 406 and an RFID modulation section 408 are provided in the ROM 410 of the SIM card. The ROM 410 of the SIM card is a digital logic circuit for realizing an operating system by using a digital CODEC and a modulation section.

A CPU 402 transfers an order to the ROM 410 such that a required function can be carried out. At this time, since RFID data is stored based on a logical structure of a conventional SIM card, RFID data can be processed as another SIM card data. In other words, functional instruction words, such as SELECTION, STATUS, READ BINARY, and UPDATE BINARY, described in "8. Description of the functions" of GSM 11.11 standard document can be used in software capable of operating RFID functions of the SIM card.

Connection pins C4 and C8, usage of which is now reserved, are connected to an RFID antenna coil (not shown) through a coil connecting section 412 connected to an interrupt section 414. Induced electromotive force is generated from the RFID antenna coil when an RFID interrogator (not shown) approaches the RFID antenna coil and induced electromotive force is transferred to the interrupt section 414 through the coil connecting section 412, thereby creating the interrupt. Upon detecting the interrupt, the CPU 402 recognizes that extracting and processing of RFID data are required. Thus, the CPU 402 reads RFID data stored in a memory section (EEPROM 404 or ROM 410) and stores RFID data in a RAM 400. In addition, the CPU 402 controls the RFID CODEC section 406 and the RFID modulation section 408 so as to process RFID data. An RFID signal outputted from the RFID modulation section 408 is transmitted to the RFID interrogator through the coil connecting section 412 with a predetermined frequency determined by the RFID system.

In addition, the CPU 402 not only detects the creation of interrupt from the interrupt section 414, but also recognizes a time for carrying out the RFID functions through various manners, such as a software timer.

When seeing the first embodiment of the present invention in view of usable power, RFID functional blocks, such as the EEPROM 404, RFID CODEC section 406, and RFID modulation section 408 receive supply voltage Vcc, which is stable voltage of a mobile terminal, through a connection terminal C1 of the SIM card. Thus, a problem caused by a conventional power supply of induced electromotive force, which is unstable depending on peripheral environment, can be solved.

When seeing the first embodiment of the present invention in view of a clock CLK, the clock supplied to a connection pin C3 is typically in a standard range of 1 MHz to 5 MHz from a clock supply of the mobile terminal. When the RFID signal is transferred to the coil connecting section 412, the CPU 402 varies the clock CLK according to the RFID system and transmits the RFID signal by synchronizing the RFID signal with the varied clock CLK.

FIG. 4 is a view showing a structure of the SIM card coupled with the RFID tag according to a second embodiment of the present invention. In FIG. 4, several already-known components of the SIM card are not illustrated.

Referring to FIG. 4, an RFID CODEC section 508 and an RFID modulation section 510 are provided in the SIM card in such a manner that the RFID CODEC section 508 and the RFID modulation section 510 are separate from a memory section.

A clock modulation section 516 modulates a clock CLK transmitted from a mobile terminal through a connection pin C3 of the SIM card, thereby generating an RFID clock signal 518 and a SIM clock signal 520. The RFID clock signal 518 has a frequency required for operating RFID functional blocks, such as the RFID CODEC section 508 and the RFID modulation section 510. The SIM clock signal has a frequency required for operating SIM functional blocks, such as a CPU 500, a RAM 502, a ROM 504, and an EEPROM 506.

Selectively, the RFID clock signal 518 can be used as a reference when the CPU 500 finally generates the RFID signal, without using the RFID clock signal 518 for the operation of the above RFID functional blocks. In this case, the above RFID functional blocks may use the clock signal identical to the clock signal of the SIM functional blocks. That is, the above RFID functional blocks may use the SIM clock signal 520. The clock is generated by means of the clock modulation section 516 and is controlled by means of a control signal 522 applied from the CPU 500.

The CPU 500 reads RFID data stored in the memory section, such as the EEPROM 506 or the ROM 504, and stores RFID data in the RAM 502. In addition, the CPU 500 transfers RFID data to the RFID CODEC section 508 so as to convert RFID data into the RFID signal through the RFID modulation section 510. The RFID signal is transferred to a coil connecting section 514 and is propagated to an exterior through an antenna coil (not shown) connected to the coil connecting section 514.

2) Logical Structure

A logical structure of the SIM card used in a GSM mobile terminal is prescribed in a GSM 11.11 standard document. In order to provide the RFID functions according to the present invention, it is required to vary the logical structure of the SIM card. However, the variation may be carried out within a predetermined range capable of maintaining flexibility.

Figures 5, 6:
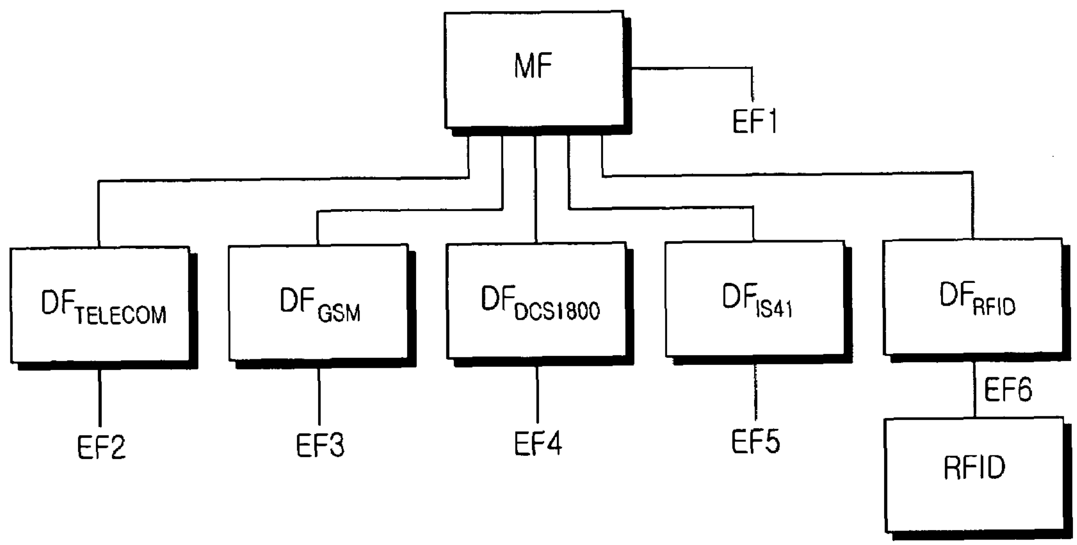
FIG. 5 is a block view showing a logical structure of an SIM card according to one embodiment of the present invention.
FIG. 6 is a view showing an EF structure for storing RFID data according to one embodiment of the present invention.

FIG. 5 is a block view showing the logical structure of the SIM card according to one embodiment of the present invention.

The logical structure of the SIM card includes a master file (MF), a dedicated file (DF), and an elementary file (EF). The MF is selected when the SIM card is initially operated and is designated as a present directory. The DF is used for providing multi-functions required for various business services, such a telecom service, a Global System for Mobile communications (GSM), a Digital Cellular System 1800 (DCS1800) or an Interim Standard 41 (IS41). The DF has the EF, which stores data utilized for each service.

In order to realize the present invention, a new DF and a new EF corresponding to the new DF are added to the conventional SIM logical system. As shown in FIG. 5, the new DF includes a $DF_{RFID}$ for the RFID function. An $EF_6$ stores RFID data for the purpose of the service.

In the SIM logical system, a file ID "7F2X" is allotted to the DF for new services. Thus, by storing RFID data in the EF corresponding to the DF having the file ID of 7F2X, it is possible to store data for the RFID service in the conventional SIM logical structure without using conventional instruction words. Such files for the RFID service are stored in the EEPROM 406 shown in FIG. 3 and the EEPROM 506 shown in FIG. 4.

FIG. 6 is a view showing an EF structure for storing RFID data according to an exemplary embodiment of the present invention.

Since the EF is based on GSM standardization, the EF is realized as an extensible file of the SIM logical structure so that conventional software can be continuously used.

A variable range of an "identifier" may depend on the file ID of the DF. For instance, if the $DF_{RFID}$ has a file ID of 7F2X, the identifier has 6F2X, 6F3X or 6F4X. A "structure" is a file structure of the EF. Transparent type, linear fixed type, and cyclic type EFs are standardized. The transparent type EF is adaptable for a sequence of bytes, such as RF data.

A "file size" is a size of RFID data to be stored (for example, 4 bytes). Software instruction words for controlling RFID data stored in the EF include READ, UPDATE, INVALIDATE, and REHABILITATE, which are based on the standardization of the GSM. In addition, executive conditions for the instruction words include CHV1 (card holder verification 1) and ADM (administration). The CHV1 represents a software task allowing a card holder to access thereto, and the ADM represents a software task allowing an administrator of the SIM card to access thereto.

3) Operation Procedure

By providing the RFID function to the conventional SIM card, a mode of the SIM card and an interface between a mobile terminal and the SIM card are varied.

Figure 7:
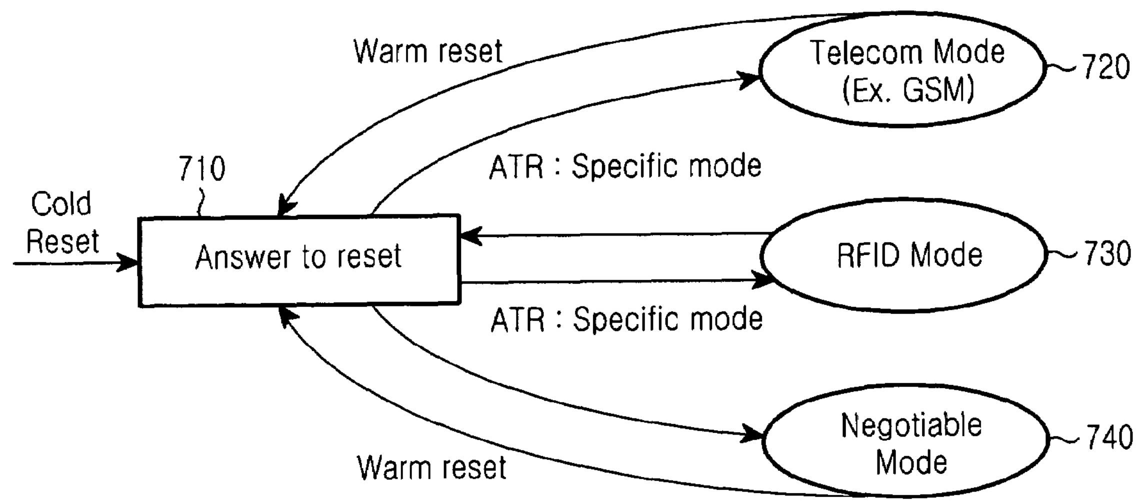
FIG. 7 is a view showing a mode transition of an SIM card according to one embodiment of the present invention.

FIG. 7 is a view showing a mode transition of the SIM card according to one embodiment of the present invention.

A mode of the SIM card can be shifted into a specific mode or a negotiable mode after transmitting an ATR (answer-to-reset) signal in response to a reset request from the mobile terminal. The specific mode is divided into a telecom mode (for example, GSM mode) and an RFID mode. Application software of the mobile terminal requests the negotiable mode through a signal exchange between the mobile terminal and the SIM card. A mode transition of a smart card into the RFID mode according to a request of the mobile terminal is one example of the negotiable mode.

The mode transition is displayed by a specific mode byte TA(2) of the ATR signal, which is prescribed in ISO/IEC 7816-3. The ATR signal is the sequence of bytes transferred to the mobile terminal from the SIM card as an answer for a reset request of the mobile terminal. The ATR signal is an asynchronous transmission.

Figure 8:
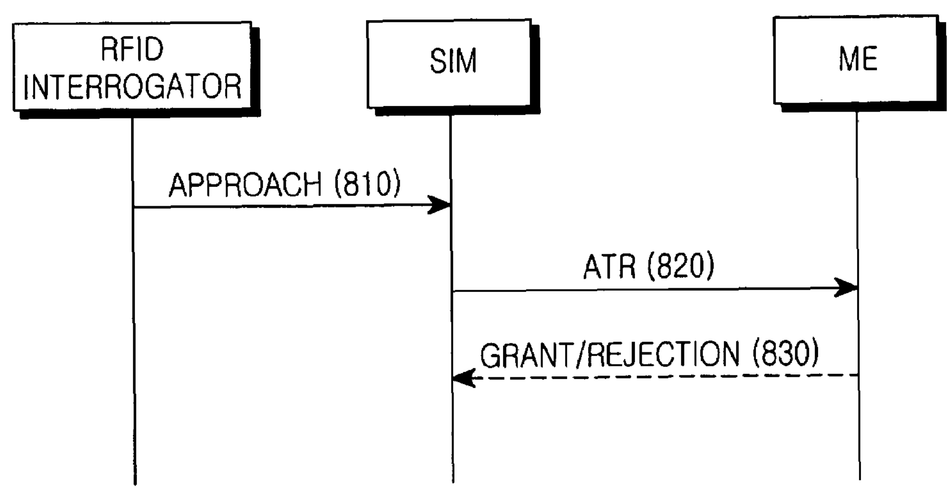
FIG. 8 is a view showing a signal exchange between a mobile terminal and a SIM card according to one embodiment of the present invention.

FIG. 8 is a view showing the signal exchange between the mobile terminal and the SIM card according to one embodiment of the present invention.

When the CPU of the SIM card having the RFID function recognizes an approach of the RFID interrogator, via the interrupt section, the CPU of the SIM card indicates the approach of the RFID interrogator to the CPU of the mobile terminal by using the ATR signal. Upon receiving the ATR signal indicating an operation of the RFID function from the SIM card, the mobile terminal grants the RFID function depending on an application program or an operational state of the mobile terminal, so that the SIM card can perform the RFID function. In addition, if it is required that mobile terminal request a primary function of the SIM card, that is, when it is required to primarily request a user's identification for a communication system or when the mobile terminal cannot perform the RFID function, the mobile terminal may reject the RFID function. In addition, without considering the priority, the mobile terminal can be designed such that the mobile terminal is converted into an RFID mode when the CPU of the mobile terminal recognizes the approach of the RFID interrogator.

Figure 9:
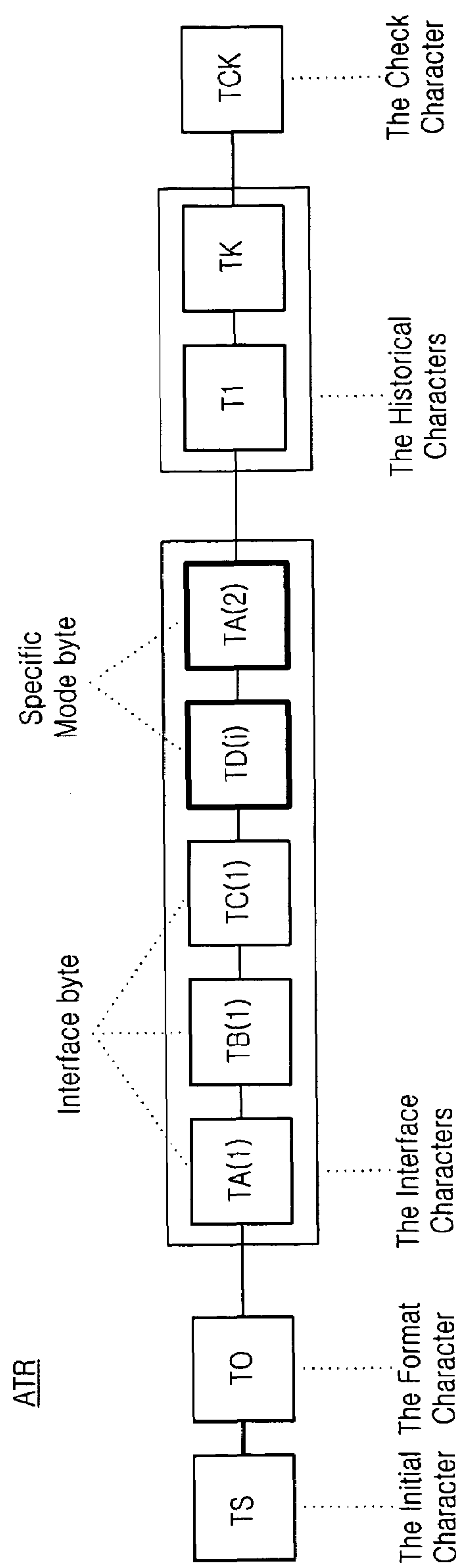
FIG. 9 is a block view showing a structure of an ATR signal shown in FIG. 8.

FIG. 9 is a block view showing a structure of the ATR signal shown in FIG. 8.

The ATR signal, which is prescribed in ISO/IEC 7816-3, is a combination of bytes transmitted in series. Usage of each byte is prescribed in ISO/IEC 7816-3. In addition, usage of some bytes is reserved. Thus, the SIM card can indicate the start of the RFID function to the mobile terminal by using the ATR signal. For instance, the ATR signal including beats (for example, beats having a lower four-beat value of "1111") capable of indicating the RFID mode can be made in the specific mode byte TA(2). The specific mode byte TA(2) may be used to indicate that a mode has been already shifted into the RFID mode from the specific mode after a cold reset (that is, when the SIM card having the RFID mode receives a request, which does not relate to the RFID, from the mobile terminal. For example, when the mobile terminal requests the user's ID). In addition, the specific mode byte TA(2) may be used to indicate the start of the RFID mode as the RFID interrogator approaches the SIM card (that is, notifying of a transition into the RFID mode from a communication mode).

According to another embodiment of the present invention, a bit indicating the RFID mode can be added to the lower four-bits of a TD(i), which is an interface byte. According to the standardization of ISO/IEC 7816-3, lower four-bits of the TD(i) and TA(2) are defined as a parameter T, wherein usage of some parameters (T=5 to 13) is reserved to use them in the future. Therefore, usage of some T values for the purpose of the RFID does not violate the standardization of ISO/IEC 7816-3, so that the SIM card can be flexibly used in a conventional system.

Figure 10:
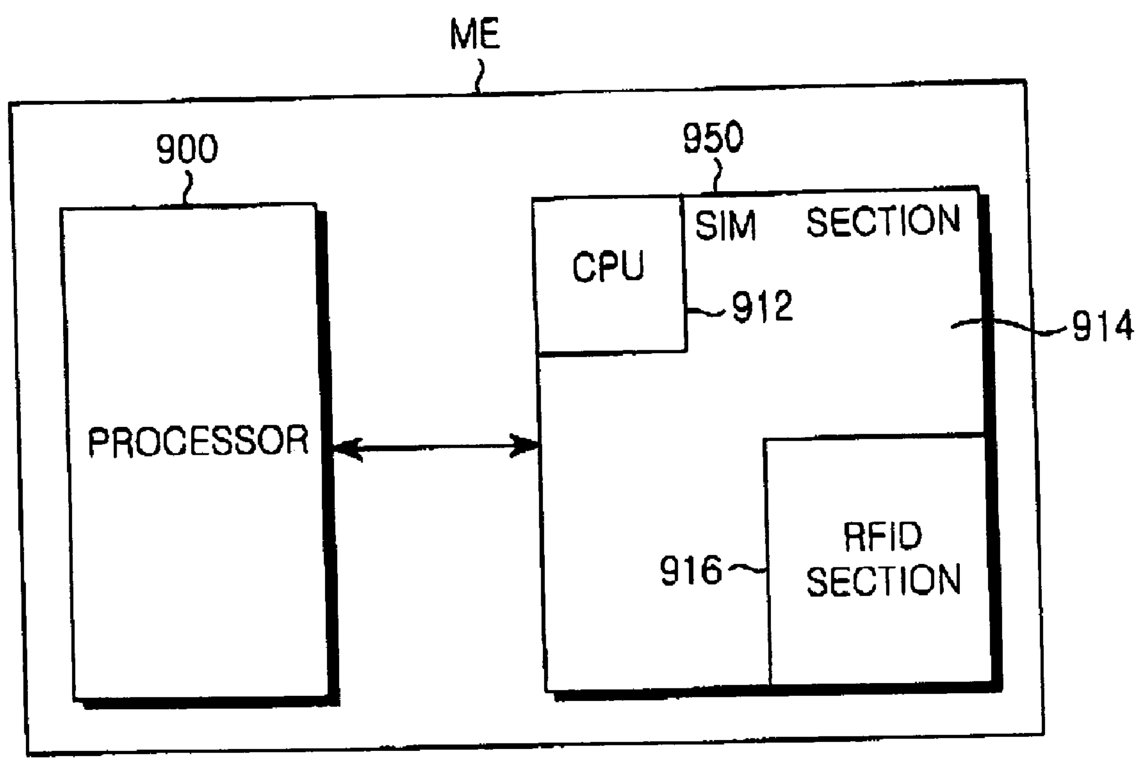
FIG. 10 is a schematic view showing a structure of a mobile terminal equipped with a SIM card having an RFID section.

FIG. 10 is a schematic view showing a structure of a mobile terminal equipped with an SIM card having an RFID section.

Reference numeral 900 represents a processor of the mobile terminal ME. An example of the processor is a mobile station modem (MSM) chip called "mobile processor" available from the Qualcomm company.

Reference numeral 950 represents the SIM card. The SIM card having the RFID section is installed in the mobile terminal in order to signal a mode transition into an RFID mode. To this end, a CPU 912, a SIM section 914 and an RFID section 916 of the SIM card 950 are only illustrated in FIG. 10. Already-known components of the SIM card 950 are not illustrated in FIG. 10.

The SIM section 914 is a user information processing section for storing user information and generating a user information signal including user information. In addition, the user information processing section includes a user information memory section for storing user information and a user program memory section having a program generating a user information signal. The user information memory section includes the EEPROM 404 and the user program memory section includes the ROM 410, as shown in FIG. 3. In addition, the user information memory section includes the EEPROM 506 and the user program memory section includes the ROM 504 as shown in FIG. 4.

The RFID section 916 is an RFID information processing section capable of storing and processing RFID data and generating an RFID signal including RFID data. In addition, the RFID information processing section includes an RFID information memory section for storing RFID information and an RFID function section for generating the RFID signal. The RFID information memory section can be provided in the EEPROM 404 or ROM 410, and the RFID function section includes the RFID CODEC section 406 and the RFID modulation section 410 as shown in FIG. 3. In addition, the RFID information memory section can be provided in the EEPROM 506 or ROM 504, and the RFID function section includes the RFID CODEC section 508 and the RFID modulation section 510, as shown in FIG. 4.

The CPU 912 is a main calculating section connected to the user information processing section to command the generation of the user information signal so as to transmit the user information signal, and connected to the RFID information processing section to command generation of the RFID signal in order to transmit the RFID signal. The CPU 912 corresponds to the CPU 402 shown in FIG. 3 and the CPU 500 shown in FIG. 4.

When an RFID interrogator (not shown) approaches the mobile terminal MT within a predetermined distance, the RFID section 916 of the SIM card 950 installed in the mobile terminal MT detects the approach of the RFID interrogator. Upon detecting the RFID interrogator, the RFID section 916 transfers detecting data to the CPU 912 of the SIM card 950 so that the SIM card 950 recognizes that the RFID function must be carried out. Accordingly, the CPU 912 of the SIM card 950 transmits a signal to the processor 900 of the mobile terminal so as to convert a mode of the mobile terminal into the RFID mode. In addition, a mode of the SIM card 950 is converted into an RFID function mode for performing the RFID function.

According to the present invention, the mobile terminal can provide stable clocks and a stable power supply to the RFID functional blocks, rather than receiving power from the RFID interrogator or providing clocks to the functional blocks that use the coil connecting section and that extract the clocks from a carrier wave signal transmitted from the RFID interrogator, thereby stabilizing the system. Conventional systems may become unstable depending on RF feeding environment if carrier wave signals and induced electromotive force are deteriorated.

As described above, the present invention performing the RFID function by utilizing the SIM card has advantages that include:

First, the SIM card can be detachably installed in the mobile terminal so as to perform the RFID functions, but the portability and miniaturization of the mobile terminal, which are important matters, are not thereby improved. If the RFID tag is separately fabricated from the SIM card, the mobile terminal may not satisfy the portability and miniaturization requirements.

Second, in a functional aspect, the present invention may upgrade the conventional SIM card, so it is possible to create a new demand for the SIM card.

Third, since an RFID technique is provided through the SIM card, an advanced RFID technique can be applied to the conventional mobile communication system. If the RFID tag is fabricated separate from the SIM card, the RFID tag may be fixed in the mobile terminal, so it is difficult to apply the advanced RFID technique to the mobile terminal.

Fourth, an earning rate of a service provider providing a service to subscribers by managing the SIM card may increase. This is because the RFID technique, which is a basis for new services, is adopted in the SIM card, making it possible to provide additional techniques based on a conventional payment charge system and a conventional user management system. If the RFID tag is fabricated separately from the SIM card, it is difficult to provide new services that utilize the RFID tag, resulting in a decreased earning rate of the service provider.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A smart card mounted on a single SIM card comprising:

a user information processing section for storing user information and generating a user information signal including user information;

an RFID information processing section for storing RFID data and generating an RFID signal including the RFID data; and a main calculating section connected to the user information processing section in order to control generation and transmission of the user information signal, and connected to the RFID information processing section in order to command generation and transmission of the RFID signal.

2. The smart card as claimed in claim 1, wherein the user information processing section includes a user information memory section for storing user information and a user program memory section including a program for generating the user information signal.

3. The smart card as claimed in claim 1, wherein the RFID information processing section includes an RFID information memory section for storing RFID information and an RFID function section for generating the RFID signal.

4. The smart card as claimed in claim 3, wherein the RFID function section includes an RFID CODEC section and an RFID modulation section.

5. The smart card as claimed in claim 1, wherein the user information processing section includes a user information memory section for storing user information and a user program memory section for storing a program generating a signal having the user information, and the RFID information processing section includes an RFID information memory section for storing RFID information and an RFID function section for generating the RFID signal.

6. The smart card as claimed in claim 5, wherein the user information memory section includes the RFID information memory section.

7. The smart card as claimed in claim 6, wherein the user program memory section includes the RFID function section.

8. The smart card as claimed in claim 1, further comprising a plurality of external pins, including a power pin, a clock pin, and a data input/output pin.

9. The smart card as claimed in claim 8, wherein one of the plurality of external pins is connected to an RFID antenna.

10. The smart card as claimed in claim 9, wherein the main calculating section transmits the RFID signal to the RFID antenna connected to the smart card.

11. The smart card as claimed in claim 1, further comprising an interrupt section which is connected to the main calculating section and which provides to the main calculating section an interrupt signal to indicate an RFID mode.

12. The smart card as claimed in claim 1, further comprising a clock generator for providing RFID clocks to the RFID information processing section.

13. The smart card as claimed in claim 12, wherein the main calculating section generates a control signal for controlling the clock generator.

14. The smart card as claimed in claim 1, further comprising a clock generator for providing RFID clocks to the main calculating section.

15. A mobile terminal comprising:

a smart card mounted on a single SIM card that includes a user information processing section for generating a user information signal including user information and installed in the mobile terminal for storing user information, the smart card including an RFID tag;

a main calculating section connected to the user information processing section in order to control generation and transmission of the user information signal, and connected to the RFID information processing section in order to command generation and transmission of the RFID signal; and a processor in communication with the smart card so as to grant or reject an RFID function of the smart card.

16. A method for performing an RFID function in a mobile terminal equipped with a smart card mounted on a single SIM card and having an RFID tag, the method comprising:

detecting an approach of an RFID interrogator by using the RFID tag;

requesting a CPU of the smart card to perform the RFID function by utilizing the RFID tag;

transmitting a mode transition signal to a processor of the mobile terminal by using the CPU of the smart card to indicate a mode transition into an RFID mode; and performing the RFID function by using the smart card after transmitting the mode transition signal.

17. The method as claimed in claim 16, wherein the mode transition signal includes a flag representing an execution of the RFID function.

18. The method as claimed in claim 16, further comprising a step of transmitting a response signal from the mobile terminal to the smart card in response to the mode transition signal.

19. The method as claimed in claim 18, wherein the response signal includes information representing a grant of the RFID function.

20. The method as claimed in claim 18, wherein the response signal includes information representing a rejection of the RFID function.

* * * * *